(12) United States Patent  
Miura et al.

(10) Patent No.: US 6,559,959 B2
(45) Date of Patent: May 6, 2003

(54) IMAGE FORMING SYSTEM INCLUDING A FIRST PRINTER CONNECTED TO A HOST COMPUTER AND A SECOND PRINTER CONNECTED TO THE HOST COMPUTER VIA A SWITCHING DEVICE PROVIDED IN THE FIRST PRINTER

(75) Inventors: Takahito Miura, Kanagawa (JP); Koichiro Maemura, Kanagawa (JP); Takeshi Hayafune, Kanagawa (JP); Masayuki Shimizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/907,274

(22) Filed: Jul. 17, 2001

(65) Prior Publication Data  
US 2002/0015173 A1 Feb. 7, 2002

Related U.S. Application Data

(62) Division of application No. 09/479,777, filed on Jan. 7, 2000, now Pat. No. 6,301,014, which is a division of application No. 08/922,579, filed on Sep. 3, 1997, now Pat. No. 6,025,924.

(30) Foreign Application Priority Data

Sep. 5, 1996 (JP) .............................................. 8-234799  
Sep. 5, 1996 (JP) .............................................. 8-234800  
Sep. 10, 1996 (JP) .............................................. 8-238758

(51) Int. Cl.$^7$ ................................................ B41B 15/00
(52) U.S. Cl. .................... 358/1.13; 358/1.14; 358/1.15; 358/1.16
(58) Field of Search ................................ 358/1.13–1.16, 358/400, 442; 709/100–108, 200–203; 710/48

(56) References Cited

U.S. PATENT DOCUMENTS

| 5,280,585 A |   | 1/1994  | Kochis et al. ............... 710/48 |
| 5,625,757 A |   | 4/1997  | Kageyama et al. ........ 358/1.14 |
| 5,630,062 A |   | 5/1997  | Okutsu ..................... 709/100 |
| 5,732,199 A | * | 3/1998  | Kuo et al. ................. 358/1.15 |
| 5,822,507 A |   | 10/1998 | Uda et al. ................. 358/1.15 |
| 5,822,508 A |   | 10/1998 | Ohara ....................... 358/1.15 |
| 5,978,557 A |   | 11/1999 | Kato ......................... 358/1.15 |
| 6,025,924 A | * | 2/2000  | Miura et al. .............. 358/1.15 |
| 6,081,347 A | * | 6/2000  | Yasuda et al. ............. 358/400 |
| 6,301,014 B1 | * | 10/2001 | Miura et al. .............. 358/1.15 |

FOREIGN PATENT DOCUMENTS

| JP | 2231622 | 9/1990  | ............. G06F/3/12 |
| JP | 5324224 | 12/1993 | ............. G06F/3/12 |

* cited by examiner

Primary Examiner—Phuoc Tran  
Assistant Examiner—Ishrat Sherali  
(74) Attorney, Agent, or Firm—Cooper & Dunham LLP

(57) ABSTRACT

An image forming system includes a first image forming apparatus which can be connected to a host computer as an image data supplying source and also connected to a second image forming apparatus so that the host computer can be selectively and reliably connected to one of the first and second image forming apparatuses. The first image forming apparatus is connected to the host computer so as to print the image data provided from the host computer. The second image forming apparatus is operatively connectable to the host computer via the first image forming apparatus so as to print the image data sent from the host computer. A switching device is provided in the first image forming apparatus. The switching device switches a connection of the host computer so that one of the first image forming apparatus and the second image forming apparatus is operatively connected to the host computer.

11 Claims, 12 Drawing Sheets

IMAGE FORMING SYSTEM INCLUDING A FIRST PRINTER CONNECTED TO A HOST COMPUTER AND A SECOND PRINTER CONNECTED TO THE HOST COMPUTER VIA A SWITCHING DEVICE PROVIDED IN THE FIRST PRINTER

This is a divisional of application Ser. No. 09/479,777 filed Jan. 7, 2000 now U.S. Pat. No. 6,301,014, which is a divisional of parent application Ser. No. 08/922,579 filed Sep. 3, 1997, now U.S. Pat. No. 6,025,924.

BACKGROUND OF THE INVENTION

1. Field of the Invention

The present invention generally relates to an image forming system and, more particularly, to an image forming system including a plurality of image forming apparatuses selectively connected to a host computer.

2. Description of the Related Art

Generally, an image forming apparatus such as a printer is connected to a personal computer to output image data or information on a recording paper. Typically, the personal computers are connected to a single printer so that the personal computer is connected to the printer on a one to one basis. A centronics interface is the most popular way to connect a printer to a personal computer. Normally, the printer is connected to the personal computer via a connector conforming to the centronics standards.

There are many types of printers such as laser printers, inkjet printers, etc. Additionally, there are also monochrome and color types of printers. Demand for use of different types of printers with a single personal computer has been increasing. A description will now be given of a typical case in which a monochrome laser printer and a color inkjet printer are available. If only the monochrome laser printer is connected to a personal computer, the need for color printing cannot be satisfied. Thus, it is also desirable to have a color inkjet printer connected to the personal computer. On the other hand, if only the color inkjet printer is connected to the personal computer, although monochrome printing can be performed as well as color printing by the color inkjet printer, this does have its disadvantages. For example, monochrome printing by a color inkjet printer has a disadvantage in that the printing speed is much slower than that of the monochrome laser printer. Additionally, the image quality of monochrome printing performed by the color inkjet printer is much lower than that of the monochrome laser printer. Accordingly, considering the fact that most printing operations are require monochrome printing, it is preferable that the monochrome printer also be connected to the personal computer.

In most cases, when two printers are commonly used with one personal computer, the user must change from one printer to the other printer by disconnecting the centronics connector of one printer and connecting the centronics connector of the other printer. This changing operation is very inconvenient for the user.

In order to eliminate such inconvenience, a switching device 101 such as shown in FIG. 1 is commercially available. The switching device 101 is provided with three connectors CN1, CN2 and CN3 so that a personal computer 102 and two printers 103 and 104 are interconnected via the switching device 101. The switching device 101 is provided to selectively connect one of the printers 103 and 104 to the personal computer 102 by control of the personal computer 102. Accordingly, the switching device 101 is intended to eliminate the disconnecting and connecting operations of the connectors of the printers 103 and 104. However, the switching operation performed by the switching device 101 lacks reliability at the present time. This may be caused by poor compatibility between the personal computer 102 and printers 103 and 104. More specifically, although the personal computer 102 and the printers 103 and 104 have an interface conforming to the centronics standard, each of the interfaces may actually conform to various local standards which are based on the centronics standard. This situation creates a problem that a personal computer may not have compatibility with a particular printer. When the above-mentioned switching device 101 is used, as viewed from the personal computer 102, it is not recognizable as to what types of printers are connected to the switching device 101.

In order to eliminate the above-mentioned problem with respect to compatibility, the printers to be connected to the switching device 101 must be limited to ones which are compatible with the personal computer 102. Accordingly, the types of printers which can be connected to the switching device 101 is limited. This results in poor reliability of the switching function of the switching device 101. That is, since generally the personal computer is not intended to be used with two printer drivers, there may be a case in which the printer is not operatively connected to the personal computer. Additionally, even if the printers 102 and 104 can be operatively connected to the personal computer 102 via the switching device 101, the total length of the cables between the personal computer 102 and each of the printers 103 and 104 becomes excessively long, resulting in an increased possibility of noise intrusion. Further, the commercially available switching device 101 may perform a switching operation which requires electrical power which cannot be provided from the personal computer 102 via the connecter C1. That is, there may be a case in which the switching device 101 must be directly connected to an external power source.

In the above-mentioned case, the personal computer 102 described as being connected to the printers 103 and 104. However, one or both of the printers 103 and 104 may be replaced by a multi-function image processing apparatus such as a multi-function peripheral (MFP) device which may include a facsimile function, a scanning function and a printing function. This results in similar problems to those discussed above.

SUMMARY OF THE INVENTION

It is a general object of the present invention to provide an improved and useful image forming system in which the above-mentioned problems are eliminated.

A more specific object of the present invention is to provide an image forming system including a first image forming apparatus which can be connected to a host computer as an image data supplying source and also to a second image forming apparatus so that the host computer can be selectively and reliably connected to one of the first and second image forming apparatuses.

According to an aspect of the present invention, an image forming system includes as least one user device for providing image data to be printed, the at least one user device selected from one of a group of a host computer and a network. A first peripheral device is connected to the at least one user device for receiving the image data from the at least one user device and for processing the received image data. A second peripheral device is operatively connected to the at least one user device via the first peripheral device for processing image data sent from the at least one user device via the first peripheral device. A switching device is provided in and controlled by the first peripheral device. The switching device automatically switches the connection of the at least one user device so that one of the first peripheral device and the second peripheral device is operatively connected to the at least one user device.

Other objects, features and advantages of the present invention will become more apparent from the following detailed description when read in conjunction with the accompanying drawings.

BRIEF DESCRIPTION OF THE DRAWINGS

Preferred embodiments of the present invention are described herein below with reference to the accompanying drawings, wherein.

DETAILED DESCRIPTION OF THE PREFERRED EMBODIMENTS

Figure 1:
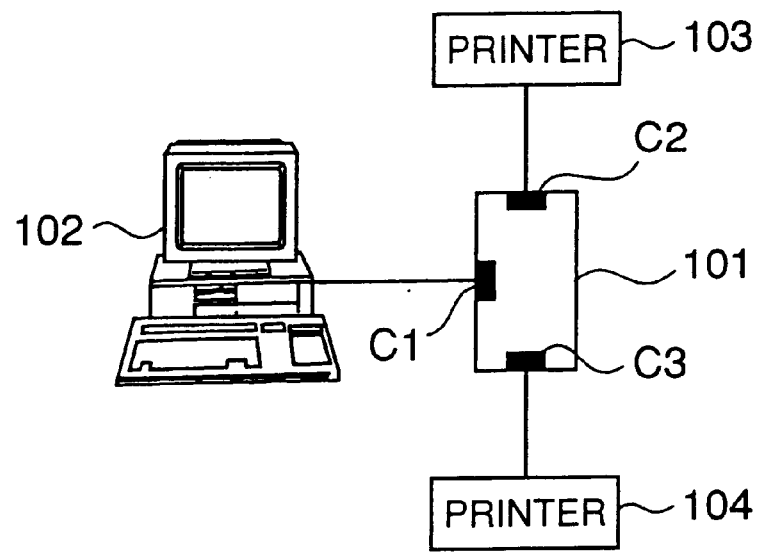
FIG. 1 is an illustration of a conventional image forming system using a switching device.
Figure 2:
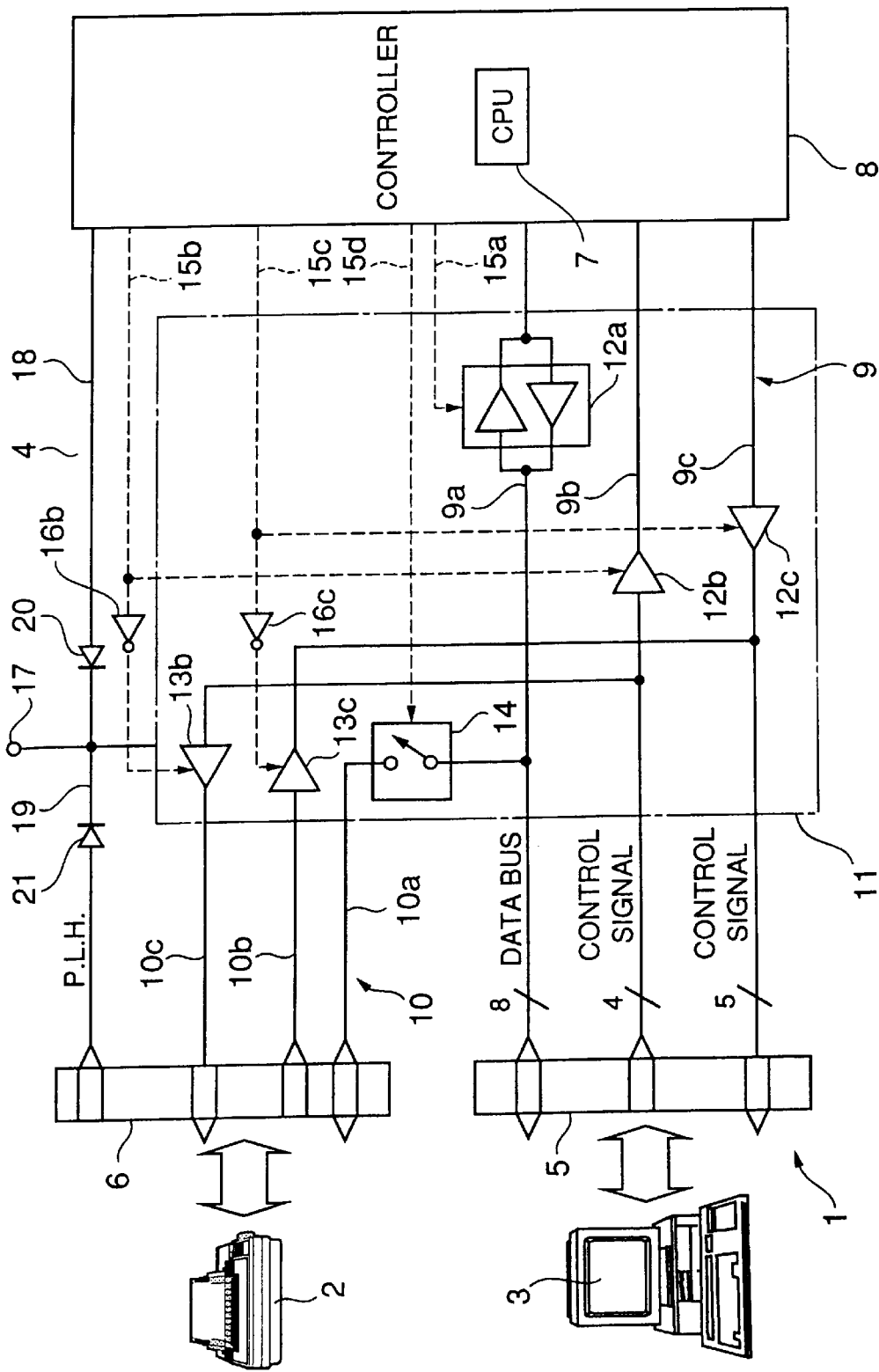
FIG. 2 is an illustration of an image forming system according to a first embodiment of the present invention.

A description will now be given, with reference to FIGS. 2 to 5, of a first embodiment of the present invention. FIG. 2 is a circuit diagram of a printer interface switching device of a monochrome laser printer included in an image forming system according to the first embodiment of the present invention.

The monochrome laser printer 1 shown in FIG. 2 is connected to a color inkjet printer 2 and also connected to a personal computer 3. That is, the personal computer 3 and two printers 1 and 2 together constitute the image forming system according to the present invention. Hereinafter, the monochrome laser printer 1 is referred to as a first printer, and the color inkjet printer 2 is referred to as a second printer.

Figure 3:
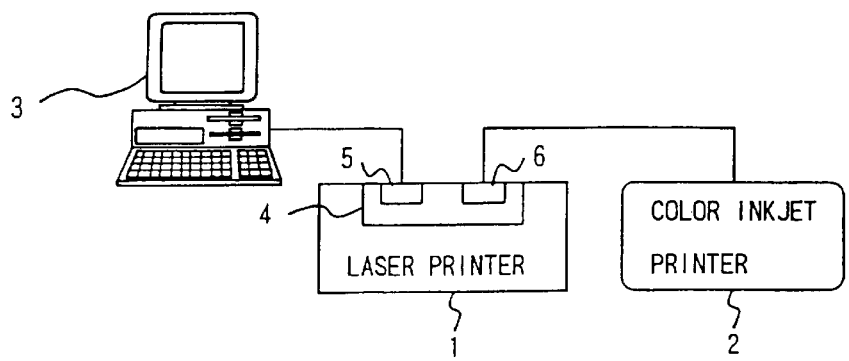
FIG. 3 is an illustration of an entire system according to the first embodiment of the present invention.

In the image forming system according to the present invention, the personal computer 3 is connected to the second printer 2 via the first printer 1 as shown in FIG. 3. The first printer 1 is provided with the printer interface switching device 4 having a switching function. The printer interface switching device 4 is basically an interface conforming to the centronics standard.

The printer interface switching device 4 is provided with a first connector 5 and a second connector 6. The first connector 5 is connected to a centronics standard connector of the personal computer 3. The second connector 6 is connected to a centronics standard connector of the second printer 2. Since the printer interface switching device 4 is incorporated into the first printer 1, the printer interface switching device 4 is connected to an electrical circuit of the first printer 1 by an internal wiring system in the first printer 1. Accordingly, there is no printer connector needed for the connection of the first printer 1.

The first printer 1 comprises therein a controller 8 including a central processing unit (CPU) 7. The connector 5 is connected to the controller 8 by a first printer signal transmission path 9. The first printer signal transmission path 9 comprises an eight-wire data bus 9a, a four-wire reception control line 9b and a five-wire transmission control line 9c. Additionally, the connector 6 is connected to the controller 8 by a second printer signal transmission path 10. The second printer signal transmission path 10 comprises a data bus 10a, a reception control line lob and a transmission control line 10c which are branched from the data bus 9a, the reception control line 9b and the transmission control line 9c, respectively.

A switching unit 11 is provided to select one of the printer signal transmission paths 9 and 10 in response to a switching signal provided by the controller 8. The switching unit 11 comprises buffers 12a, 12b, 12c, 13b and 13c and a switch 14. The buffers 12a, 12b and 12c can be set to either an active state or an inactive state, and are provided on the data bus 9a, the reception control line 9b and the transmission control line 9c, respectively. The buffers 13b and 13c can be set to either an active state or an inactive state, and are provided on the reception control line 10b and the transmission control line 10c, respectively. The switch 14 is controlled to be turned on or off, and is provided on the data bus 10a. The buffer 12a is a bidirectional buffer.

The buffer 12a is connected to the controller 8 via a control line 15a so as to provide a switching signal which controls the operational state of the buffer 12a. The buffers 12b and 13b are connected to the controller 8 via the control line 15b so as to provide a switching signal which selectively sets one of the buffers 12b and 13b to the activated state. The buffers 12c and 13c are connected to the controller 8 via the control line 15c so as to provide a switching signal which selectively sets one of the buffers 12c and 13c to the activated state. The switch 14 is connected to the controller 8 via a control line 15d so as to provide a switching signal which controls the operational state of switch 14. Additionally, inverters 16b and 16c are provided to the control lines 15b and 15c connected to the buffers 13b and 13c, respectively, so as to invert the switching signals on the control lines 15b and 15c.

A power source 17 is provided to operate the switching unit 11. Power is provided to the power source 17 from the controller 8 via a power source line 18, and also provided from the second printer 2 via a peripheral logic high (P.L.H.) line 19 of the second connector 6. The P.L.H. line 19 is provided for checking whether power of the second printer 2 is turned on. Specifically, the centronics interface is provided with a small current from the second printer 2. Since diodes 20 and 21 are provided on the power source line 18 and the P.L.H. line 19, respectively, the two lines 18 and 19 are connected in a logic summing manner.

When the first printer 1 is turned on, the switching signals provided to the control lines 15a, 15b and 15c are initially set to a high level, and the switching signal provided to the control line 15d is initially set to a low level. In this state, since the buffers 12a to 12c are in the active state, the switch 14 is turned off and the buffers 13b and 13c are in the inactive state, and the first printer signal transmission path 9 is set to be effective.

Additionally, the personal computer 3 has a function for selectively designating one of the first printer 1 and the second printer 2. The personal computer 3 also has a switching command sending function for selecting a printer driver based on the designated selection. Specifically, for example, when a printing operation for an application of a word processor is performed, the first printer 1 can be automatically designated by selecting the printer driver for the first printer 1. Alternatively, when a printing operation for an application of a word processor is performed, the second printer 2 can be automatically designated by selecting the printer driver for the second printer 2. This function is performed by a CPU (not shown in the figure) of the personal computer 3.

The first printer 1 includes, in addition to the CPU 7, a ROM fixedly storing data such as programs and a RAM rewritably storing various information. The CPU 7 performs various processes and controls in accordance with the program data stored in the ROM 7. For example, in the present embodiment, a determining function and a path state switching function are provided. The determining function determines, when a switching command is sent by the switching command sending function performs by personal computer 3 which is used for selecting a printer driver in accordance with the operation for designating the printer performed on the personal computer 3 side, whether the switching command designates the first printer 1 or the second printer 2. Additionally, the path state switching function switches the state of paths by operating the switching unit 11 so as to effect one of the first printer signal reception path 9 and the second printer signal reception path 10 in accordance with the result of the determination made by the determining function.

In the above-mentioned structure in which two printers 1 and 2 are connected to the personal computer 3, when all power is turned on, the controller 8 changes the switching signals on the control lines 15a, 15b and 15c to the high level. The switching signal on the control line 15d is at the low level. Accordingly, the first printer signal transmission path 9 is selected, resulting in an equivalent state where the first printer 1 is connected to the personal computer 3. Thus, a printing operation can be performed by the first printer 1 by sending character print data, other data or signals. In this case, monochrome printing can be provided with a high quality image and at a high-speed.

Figure 4:
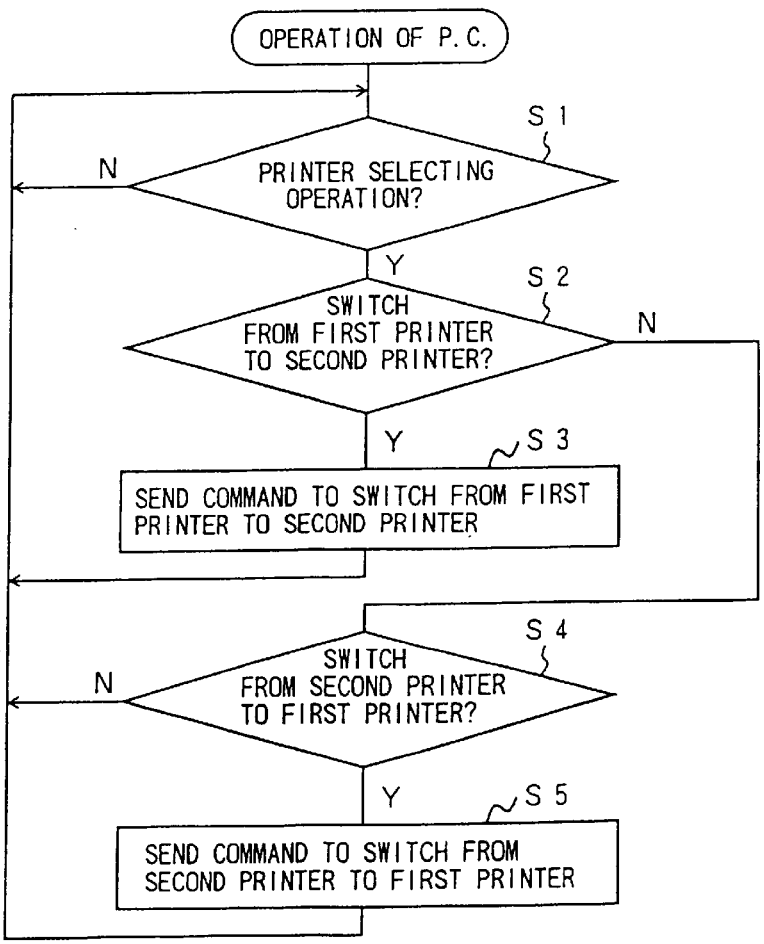
FIG. 4 is a flowchart of an operation performed by a personal computer shown in FIG. 3.
Figure 5:
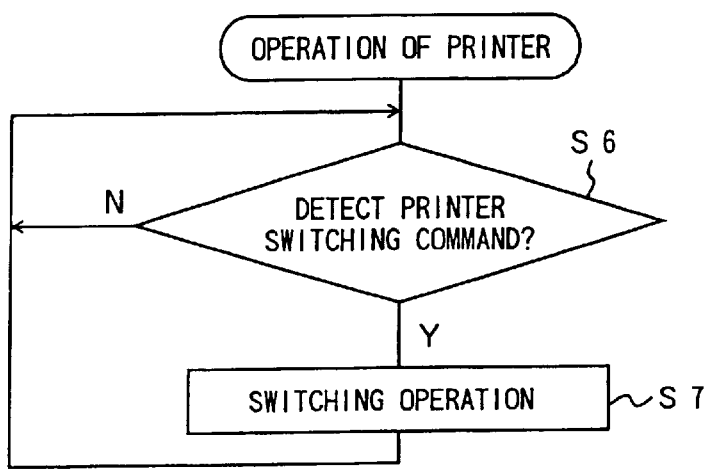
FIG. 5 is a flowchart of an operation performed in a first printer shown in FIG. 3.

A description will now be given, with reference to FIGS. 3 and 4, of switching to the second printer 2 and switching back to the first printer 1. The flowchart shown in FIG. 4 is a procedure performed by the personal computer 3. In order to switch to a printer to be used, the printer driver corresponding to the printer to be used is selected on the personal computer 3 when a printing operation is performed in the word processor application. Accordingly, it is determined first, in step S1, whether or not an operation for selecting the printer is performed. If it is determined that the operation for selecting is performed, it is then determined, in step S2, whether or not to switch from the first printer 1 to the second printer 2. If the determination of step S2 is negative, it is determined, in step S4, whether or not to switch from the second printer 2 to the first printer 1. On the other hand, if the determination of step S2 is affirmative, the routine proceeds to step S3 where the personal computer 3 sends to the first printer 1 a switching command which indicates to switch from the first printer 1 to the second printer 2.

If it is determined, in step S4, that the switching is to be from the second printer 2 to the first printer 1, the routine proceeds to step S5. In step S5, the personal computer 3 sends to the first printer 1 a switching command which indicates to switch from the second printer 2 to the first printer 1. The process of steps S3 to S5 is performed as a function of the switching command sending function performed in the personal computer 3.

According to the present embodiment, personal computer 3 executes a program which monitors the currently selected printer driver. If a printer driver for driving printer 1 is selected, a command is sent to switch to printer 1. On the other hand, if a printer driver for driving printer 2 is selected, a command is sent to switch to printer 2.

When a command is sent from the personal computer 3 to the first printer 1 via the connector 5, the command is received in the CPU 7 of the controller 8. It is then determined, in step S6 of FIG. 5, whether or not the command is a switching command for the printer. If it is determined that the command is the switching command, the switching unit 11 is operated, in step S7, so as to switch from the present printer to the other printer. That is, when the switching command is input and if the command represents a command for switching from the first printer 1 to the second printer 2, the switching signal provided to the switching unit 11 is changed from the high level to the low level. Thereby, the second printer signal transmission path 10 is effected. This state is equivalent to the state where only the second printer 2 is connected to the personal computer 3. Thus, a printing operation is performed by the second printer by sending character image data or other necessary data to the second printer 2 via the second printer signal transmission path 10. In this case, a multi-color printing can be provided. When viewing from the first printer 1, the character image data passes through the first printer to the second printer 2.

On the other hand, when the switching command is input and if the command represents a command for switching from the second printer 2 to the first printer 1, the switching signal provided to the switching unit 11 is changed from the low level to the high level. Thereby, the first printer signal transmission path 9 is effected. This state is equivalent to the state where only the first printer 1 is connected to the personal computer 3. Thus, a printing operation is performed by the first printer by sending character image data or other necessary data to the first printer 1 via the first printer signal transmission path 9. Accordingly, the process of step S6 is performed as the function of the determining function, and the process of step S7 is performed as the function of the path state switching function.

As mentioned above, according to the present embodiment, the first printer 1 itself has the connector function and the switching function so that the printers 1 and 2 are connected to a single centronics interface line extending from the personal computer 3. That is, a system can be provided in which a remote switching control is performed by the personal computer 3. Especially, according to the present embodiment, since the system is constructed so that the first printer 1 is the center of the system by providing the switching function to the interface unit of the first printer 2 which is one of the objects to switch, at least all of the command system of the first printer 1 is known. Thus, even if the command system of the second printer 2 is unknown, switching between the first printer 1 and the second printer 2 can be reliably performed. Additionally, since the first printer itself has the switching function in the interface unit, the connection of the first printer 1 can be achieved by internal wiring without a connector. Thus, a length of wire or cable can be shorter than that of a case in which a separate switching device 101 is used. This improves antinoise characteristics. Further, since the first printer 1 has the switching device therein, a power source for the switching device can be the power source for the first printer 1. That is, a separate power source is not needed as in the case of the conventional switching device 101.

Figure 6:
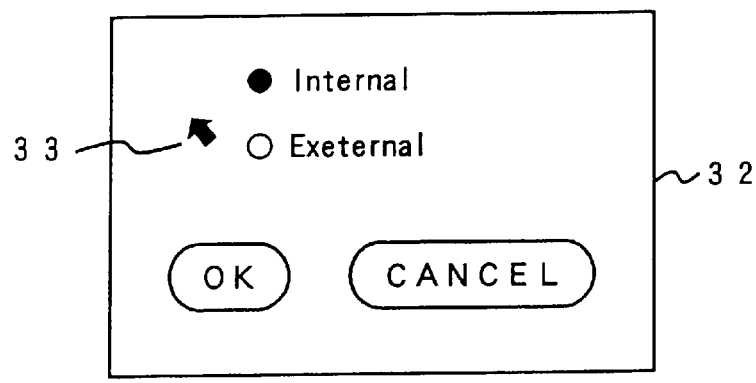
FIG. 6 is an illustration of a dialog window displayed on a personal computer provided in an image forming system according to a second embodiment of the present invention.
Figure 7:
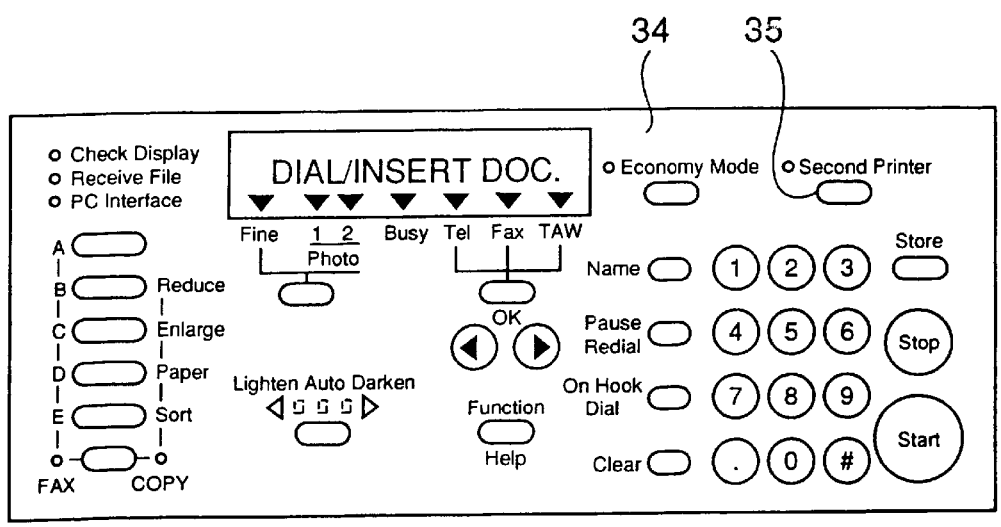
FIG. 7 is an illustration of an operational panel of a printer provided in an image forming system according to a third embodiment of the present invention.

A description will now be given, with reference to FIG. 6, of a second embodiment of the present invention. An image forming system according to the second embodiment is similar to that of the above-mentioned first embodiment except for a dialog program being provided in the personal computer 3 as a means for designating one of the first printer 1 (internal printer) and the second printer 2 (external printer). FIG. 6 shows a dialog window 32 for designating one of the internal printer and the external printer. Before starting a printing operation, the dialog window 32 is displayed, and a user can select one of the internal printer and the external printer by moving a pointer or cursor 33 by a mouse or similar cursor control means. When one of the internal printer and the external printer is selected in the dialog window 32, the switching command is sent from the personal computer 3 to the first printer 1 similar to the process of steps S3 and S5 shown in FIG. 4. Then, the process of steps S6 and S7 shown in FIG>5 is performed in the first printer 1.

Thus, according to the present embodiment, the first printer itself has the connector function and the switching function so that the two printers 1 and 2 are connected to the personal computer 3 via a single centronics interface line extending from the personal computer 3. That is, a system can be provided in which a remote switching control is performed by the personal computer 3.

A description will now be given, with reference to FIGS. 7 and 8A–8C, of other embodiments of the present invention. An image forming system according to these embodiments is similar to that of the above-mentioned first embodiment except for an operational panel 34 shown in FIG. 7 being provided on the first printer 1. The operational panel 34 has a printer designating part 35 for designating the printer to be used. Since the operational panel 34 is provided on the first printer 1, the printer designating part 35 is operated only when the second printer 2 is to be used. For example, the printer designating part 35 can be in the form of a key for inputting a command to switch to the second printer. Thus, the first printer 1 is always monitoring whether or not the printer designating part 35 is operated as indicated by step S11 of the flowchart of FIG. 8A. When it is determined that the printer designating part 35 is operated, the state of the switching signal is changed, in step S12, so that the second printer signal transmission path 10 is effected. The process of step S12 is performed as the function of the path state switching function which switches the state of the path so as to effect one of the first printer signal transmission path 9 and the second printer signal transmission path 10 in response to the operation of the printer designating part 35.

Figure 8A:
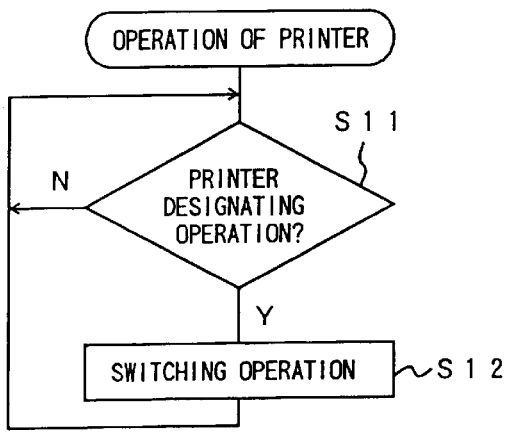
FIGS. 8A–8C are flowcharts of operations that can be performed by a printer provided in the image forming system according to embodiments of the present invention.
Figure 8B:
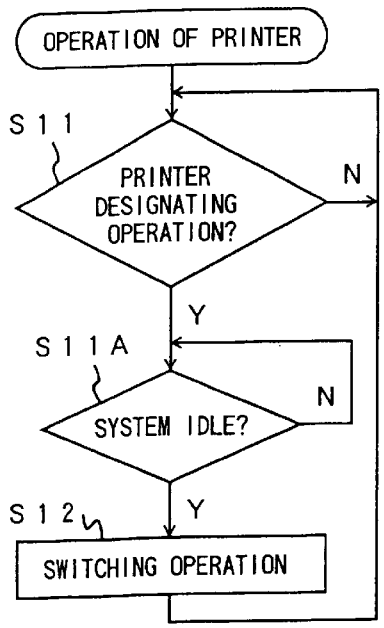
Figure 8C:
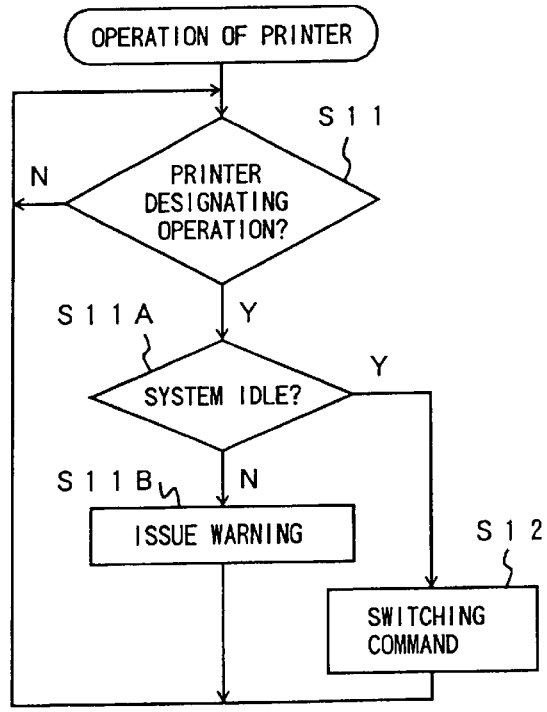

Of course, variations of the embodiment depicted in FIG. 8A are possible. As shown in FIG. 8B, when it is detected in step S11 that the printer designating part 35 has been operated, a determination is made in step S11A whether the system is idle (e.g., whether the printer 1 is currently printing). The system waits until the system is idle (Yes in step S11A) and then switched to the printer 2 in step S12. In addition, as described with respect to FIG. 8A, if the printer 2 is currently selected, if it is determined in step S11 that a printer designating operation has again been performed (e.g., a user desires to switch back to the printer 1), the switching operation can proceed immediately to step S12 for switching back to the printer 1. In the alternative, as shown in FIG. 8C, if it is determined in step S11 that the printer designating operation has again been performed (e.g., the user desires to switch back to the printer 1), a determination is made in step S11A whether the system is idle. If the system is not idle, (e.g., printer 215 is currently printing), a warning can be issued in step S11B. The warning can be issued to the user by displaying a message indication that the printer 2 is currently printing and the printer 1 can not be selected. If the system is idle, the process proceeds to step S12 and a switching command is issued.

The determination of whether the system is idle can be made by controller 8 by controlling bidirectional buffer 12a so as to monitor the data on the data bus 9a. Thus, a determination can be mode by the printer 1 that the system is busy, even if the printer 2 is the currently selected printer.

Thus, according to the present embodiment, the first printer itself has the connector function and the switching function so that the two printers 1 and 2 are connected to the personal computer 3 via a single centronics interface line extending from the personal computer 3. That is, a system can be provided in which a switching control can be performed by an operation of the printer designating part 35.

A description will now be given, with reference to FIG. 9, of a fourth embodiment of the present invention. In the present embodiment, the CPU 7 performs the processes corresponding to the determining function and the path state switching functions as follows. The determining function determines a time for switching the printer by monitoring whether the state where no command data is provided continues for a predetermined time period while the second printer signal transmission path 10 is effective. Additionally, the path state switching function switches the state of the path so as to effect the first printer signal transmission path 9 by operating the switching unit 11 when it is determined by the determining function that it is time for switching the printer. That is, the present embodiment automatically returns the system to a state where the first printer 1 is usable when the system is set to a state where the second printer 2 is usable. It should be noted that a switching operation to the second printer 2 may be performed in an appropriate manner such as disclosed in one of the aforementioned embodiments. Additionally, the present embodiment is provided with a timer, which is started at a predetermined time and counts a clock signal, so as to specify the predetermined time period for use of the determining function.

Figure 9:
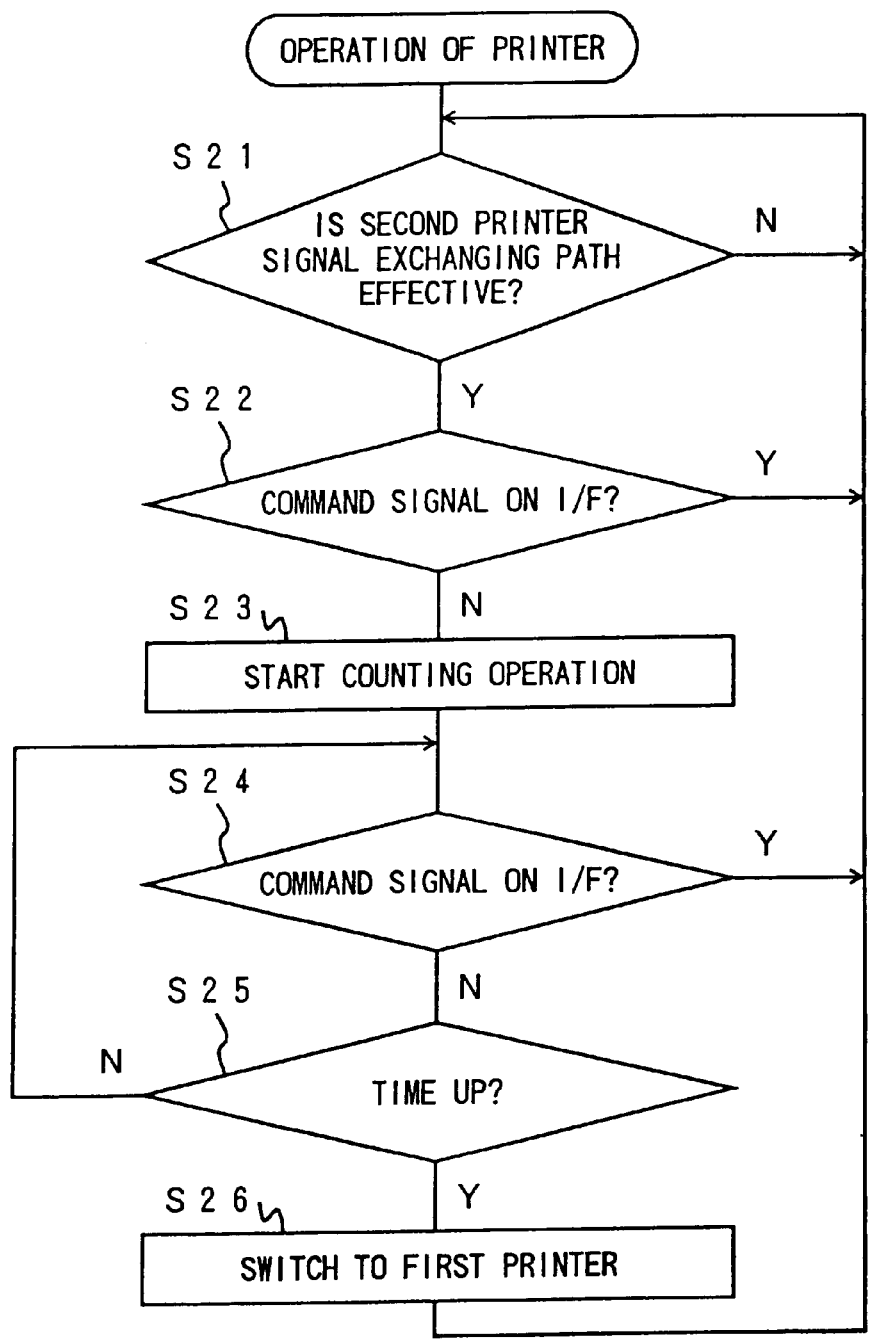
FIG. 9 is a flowchart of an operation performed by a printer provided in an image forming apparatus according to a fourth embodiment of the present invention.

Referring to FIG. 9, in the present embodiment, the CPU 7 always monitors the state of the printer interface switching device 4 so as to determine, in step S21, whether or not the second printer signal transmission path 10 is effective. This determination can be performed based on the present state of the switching signal. If the system is in the state where the first printer 1 is usable, there is no need to switch the printer. If the system is in the state where the second printer 2 is usable, it is determined, in step S22, whether or not the command data signal is sent from the personal computer 3 to the printer interface switching device 4. This determination can be performed by monitoring data on the data bus 10a, which data is sent from the personal computer 3 while the bidirectional buffer 12a on the data bus 9a is continuously controlled in an active state. If command data is sent while the system is in the state where the second printer is usable, a switching operation is not performed since the second printer 2 is being used. On the other hand, if the command data is not sent in the state where the second printer 2 is usable, the operation of a timer (not shown) is started in step S23. Then, it is determined, in step S24, whether or not the command data is sent. If it is determined that the command data is sent from the personal computer 3 to the printer interface switching circuit 4 during the counting operation of the timer, the routine is ended so that no switching operation is performed and the system is maintained in the state where the second printer is usable. On the other hand, in step S25, it is determined whether or not the counting operation of the timer has terminated. When no command data is sent from the personal computer 3 until the counting operation has terminated, the state of the switching signal provided to the switching unit 11 is changed, in step S26, from the low level to the high level. Thereby, the first printer signal transmission path 9 is effected, and the system is set to the state which is equivalent to a state where only the first printer 1 is connected to the personal printer 3. Accordingly, the process of steps S21 to S25 is performed as a function of the determining function, and the process of step S26 is performed as a function of the path state switching function.

According to the present embodiment, the system is automatically returned to the state where the first printer 1 is usable if the second printer 2 is not used for the predetermined continuous time period even if the system is set to the state where the second printer 2 is usable. That is, since the system according to the present embodiment is constructed as the first printer 1 is the center of the system, the state where the first printer 1 is usable is given priority. This condition facilitates the control of the system, over the state where the second printer 2 is usable by automatically setting the first printer signal transmission path 9 to be effective.

Figure 10:
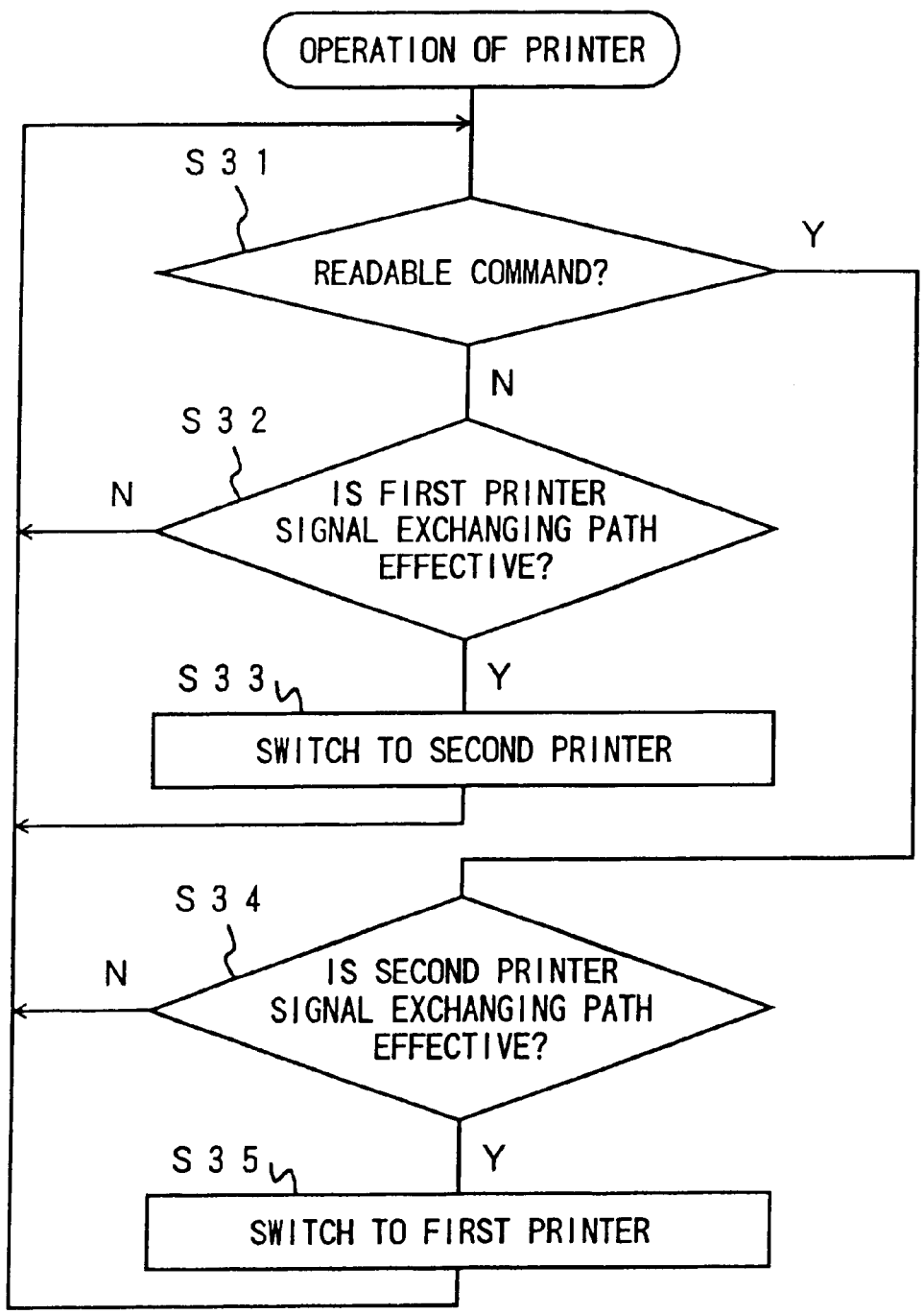
FIG. 10 is a flowchart of an operation performed by a printer provided in an image forming apparatus according to a fifth embodiment of the present invention.

A description will now be given, with reference to FIG. 10, of a fifth embodiment of the present invention. In the present embodiment, the CPU 7 performs the processes corresponding to the determining function and the path state switching function as follows. The determining function determines, when a command is sent from the personal computer 3, whether or not the command conform to the system command. The path state switching function changes the state of the path so as to effect the second printer signal transmission path 10 when it is determined that an unreadable command is sent from the personal computer 3 while the first printer signal transmission path 9 is effective. on the other hand, the path state switching function changes the state of the path so as to effect the first printer signal transmission path 9 when it is determined that a readable command is sent from the personal computer 3 while the second printer signal transmission path 10 is effective. It should be noted that a FIFO buffer is provided in the RAM of the controller 8 so as to temporarily store information provided by the personal computer 3.

In the present embodiment, when the command is sent from the personal computer 3 to the printer interface switching device 4, the command is taken by the CPU 7 of the controller 8 via the bidirectional buffer 12a on the data bus 9a. It is then determined, in step S31, whether or not the command is readable by the CPU 7. If the command is designated for the first printer 1, the command must be readable by the CPU 7. Thus, in this case, it is determined, in step S32, whether or not the first printer signal transmission path 9 is effective. If it is determined, in step S31, that the command is not readable by the CPU 70, the routine proceeds to step S34 where it is determined whether the second printer signal transmission path 10 is effective. If it is determined that the second printer signal transmission path 10 is effective, the routine proceeds to step S35. In step S35, the switching signal provided to the switching unit 11 is changed from the low level to the high level so that the first printer signal transmission path 9 becomes effective. On the other hand, if it is determined, in step S31, that the command from the personal computer 3 is not readable by the CPU 7, this means that the command is not designated for the first printer 1, and the routine proceeds to step S32. In step S32, it is determined whether or not the first printer signal transmission path 9 is effective. If it is determined that the first printer signal transmission path 9 is not effective, that is, the second printer signal transmission path 10 is effective, the routine is ended. On the other hand, if it is determined, in step S32, that the first printer signal transmission path 9 is effective, the switching signal provided to the switching unit 11 is changed from the high level to the low level so that the second printer signal transmission path 10 becomes effective.

As mentioned above, in the present embodiment, a different operation is performed based on the determination of whether the command sent from the personal computer 3 is readable or unreadable. When the command is readable, it is interpreted that the command is designated for the first printer 1, and the first printer signal transmission path 9 is maintained effective or changed to be effective. On the other hand, if the command is unreadable, it is interpreted that the command is designated for the second printer, and the second printer signal transmission path 10 is maintained effective or changed to be effective. It should be noted that the process of step S31 is performed as a function of the determining function, and the process of steps S32 to S35 is performed as a function of the path state switching function.

It should be noted that, in the present embodiment, the command sent from the personal computer 3 is subjected to a reading operation by the CPU 7, and simultaneously stored in the FIFO buffer. Then, if the command is not readable by the CPU 7, the command temporarily stored in the FIFO buffer is sent to the second printer 2 through the second printer signal transmission path 10. If the FIFO buffer is not provided, the command which was received and interpreted as not readable is lost, and the command cannot be sent to the printer 2.

According to the present embodiment, since the switching function for the printers is provided in the interface unit of the first printer 1, the first printer 1 is located in the center of the system. Thus, taking into consideration that the command system of the first printer is known, if the command is not readable, this does not assure that the command is designated for the printer 2 but it can be interpreted that the command is at least not designated for the printer 1 and the switching operation is performed. Thus, the switching of the printers can be appropriately performed by utilizing the command itself.

Figure 11:
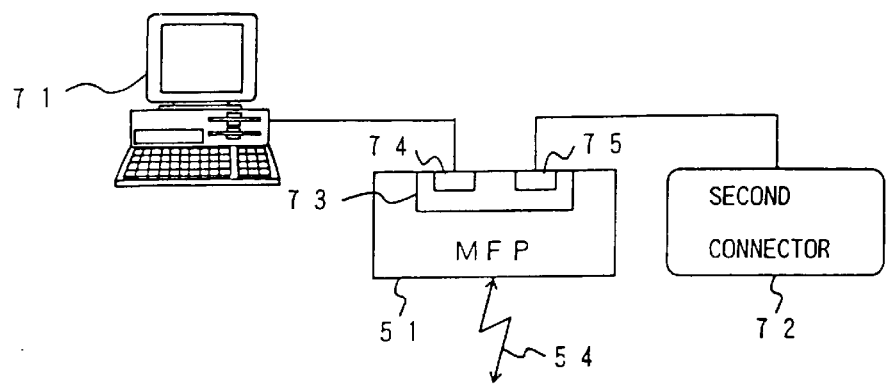
FIG. 11 is an illustration of an image forming system according to a sixth embodiment of the present invention.

A description will now be given of a sixth embodiment of the present invention. FIG. 11 is an illustration of an entire image forming system according to the sixth embodiment of the present invention. In this system, a multi-function peripheral (MFP) device 51 and a second peripheral device 72 are used instead of the first printer 1 and the second printer 2 in the above-mentioned embodiments, respectively. The MFP device 51 has an interface switching device 73 which includes a first connector 74 and a second connector 75. A personal computer 71 is connected to the MFP device 51 via the first connector 74. The second peripheral device 72 is connected to the MFP device 51 via the second connector 75. A facsimile line 54 is connected to the MFP device 51.

Figure 12:
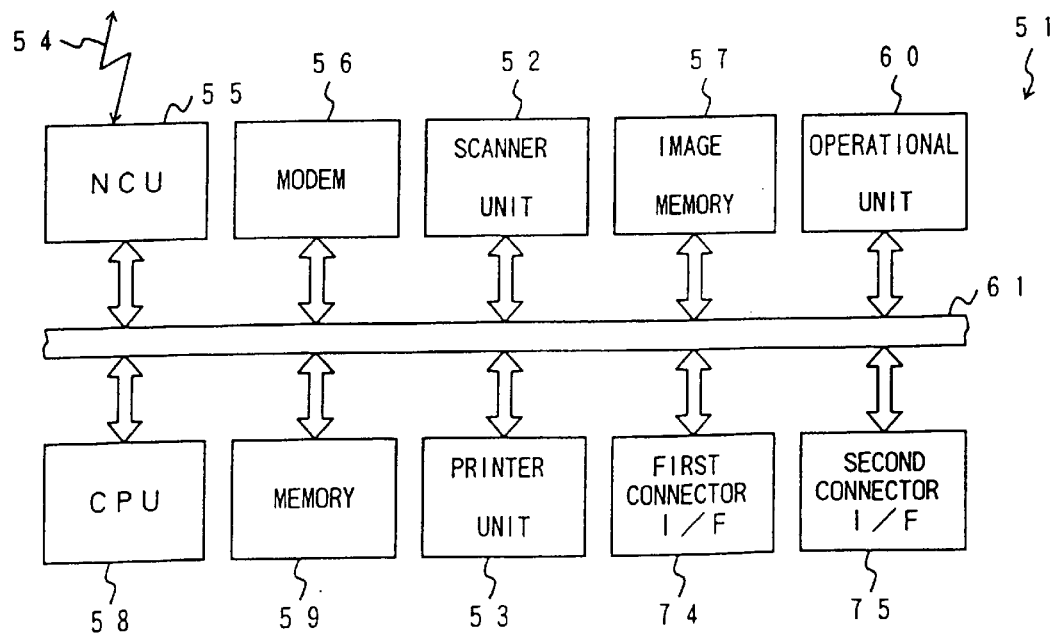
FIG. 12 is a block diagram of a multi-function peripheral device shown in FIG. 11.

FIG. 12 is a block diagram of the MFP device 51 shown in FIG. 11. The MFP device 51 comprises a scanner unit 52, a printer unit 53, a network control unit (NCU) 55, a modem 56, an image memory 57, a central processing unit (CPU) 58, a memory 59, an operational unit 60, the first connector interface 74 and the second connector interface 75 which are interconnected by a bus line 61.

The scanner unit 52 scans an original image and outputs image data corresponding to the original image. The printer unit 53 outputs an image on a recording sheet according to image data supplied thereto. The NCU 55 corresponds to a facsimile communication unit which transmits and receives data through the facsimile line 54. The image memory 57 stores the image data generated by the scanner unit 52 or image data received by the NCU 55. The operational unit 10 is provided for inputting various instructions to control the MFP device 51. Thus, the MFP device 51 has a scanner function, a printer function and a facsimile function.

The scanner unit 52 is a sheet scanner which scans images of original documents fed by an automatic document feeder (ADF) (not shown in the figure) by a contact-type optoelectric conversion element fixedly provided at a scanning position. Thus the original image is read and electrical signals corresponding to the original images are generated. The printer unit 53 prints on a recording sheet based on digital image data. The printer unit 53 comprises, for example, a laser printer which includes a monochrome laser writing system and an electrophtographic device. The memory 59 comprises a ROM for fixedly storing data such as programs and a RAM for rewritably storing various types of information. The CPU 8 performs various processes and controls in accordance with the programs stored in the ROM.

As mentioned above, the MFP device 51 together with the personal computer 71 and the second peripheral device 72 are components of an image forming system in which the personal computer 71 can be connected to one of the MFP device 51 and the second peripheral device 72. In the present embodiment, the second peripheral device 72 is a color inkjet printer which has a printing capability different from that of the printer unit 53 of the MFP device 51. Hereinafter, the second peripheral device 72 may be referred to as a second printer 72.

The personal computer 71 is connected to the second printer 72 via the MFP 1. Thus, the MFP 1 is provided with the interface switching device 73 which has a switching function. Basically, the interface switching device 73 conforms to the centronics standard.

Figure 13:
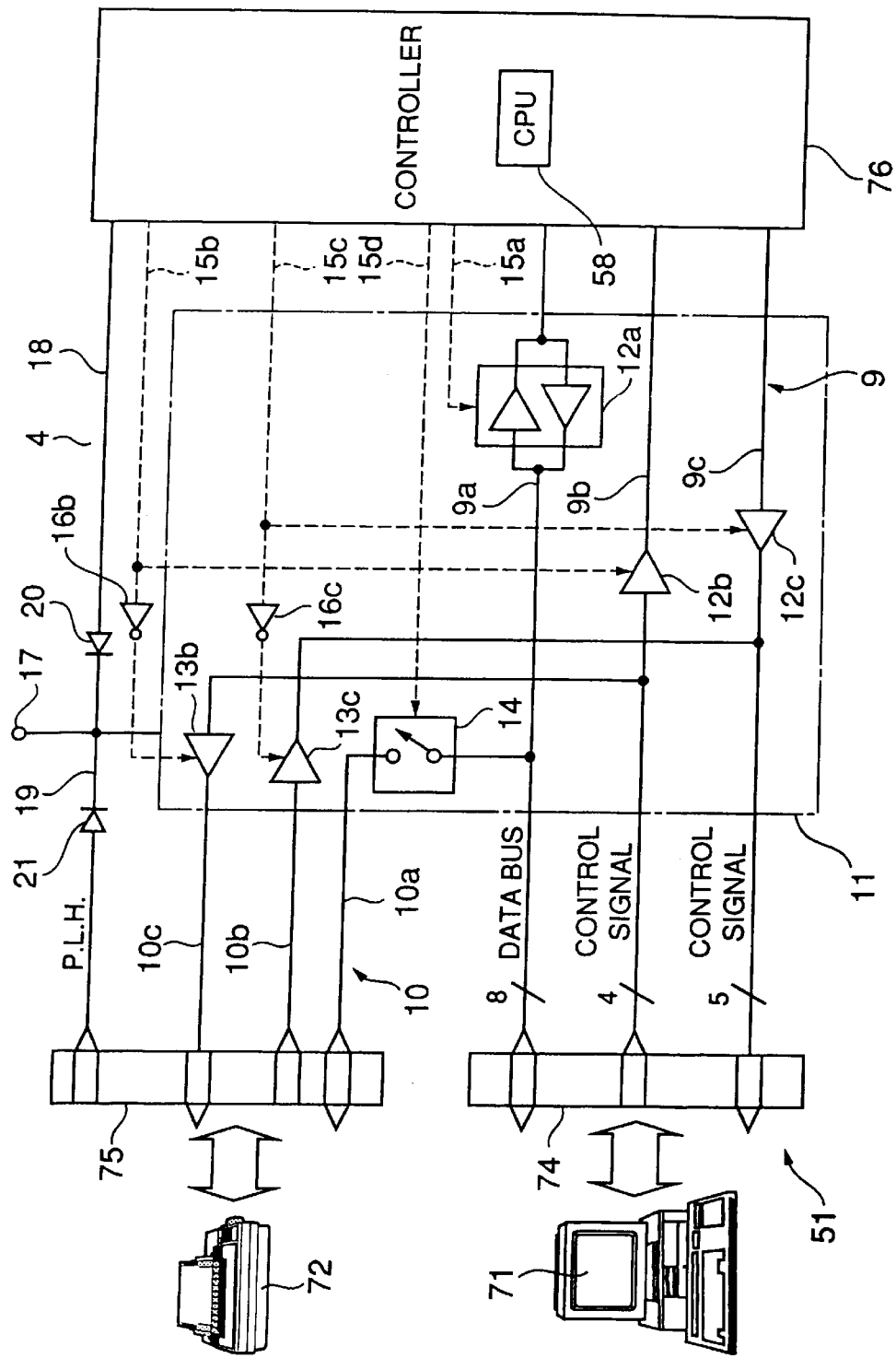
FIG. 13 is a circuit diagram of a switching device shown in FIG. 11.

FIG. 13 is a circuit diagram of the switching device 73. In FIG. 13, parts that are the same as the parts shown in FIG. 2 are given the same reference numerals.

The switching device 73 is provided with a first connector interface 74 and a second connector interface 75. The first connector interface 74 is connected to a centronics standard connector of the personal computer 71. The second connector interface 75 is connected to a centronics standard connector (not shown in the figure) of the second printer 72. Since the switching device 73 is incorporated into the MFP device 51, the switching device 73 is connected to the electrical circuit of the MFP device 73 by an internal wiring system in the MFP device 51. Accordingly, there is no printer connector needed for the connection of the MFP device 51.

The MFP device 1 comprises a controller 76 including the central processing unit (CPU) 58. The first connector interface 74 is connected to the controller 76 by a first printer signal transmission path 9. The first printer signal transmission path 9 comprises an eight-wire data bus 9a, a four-wire reception control line 9b and a five-wire transmission control line 9c. Additionally, the second connector interface 75 is connected to the controller 76 by a second printer signal transmission path 10. The second printer signal transmission path 10 comprises a data bus 10a, a reception control line 10b and a transmission control line 10c which are branched from the data bus 9a, the reception control line 9b and the transmission control line 9c, respectively.

A switching unit 11 is provided so as to effect one of the printer signal transmission paths 9 and 10 in response to a switching signal provided by the controller 76. The switching unit 11 comprises buffers 12a, 12b, 12c, 13b and 13c and a switch 14. The buffers 12a, 12b and 12c can be set to either an active state or inactive state, and are provided on the data bus 9a, the reception control line 9b and the transmission control line 9c, respectively. The buffers 13b and 13c can be set to either an active state or inactive state, and are provided on the reception control line 10b and the transmission control line 10c, respectively. The switch 14 is controlled to be turned on or off, and is provided on the data bus 10a. The buffer 12a is a bidirectional buffer.

The buffer 12a is connected to the controller 76 via a control line 15a so as to provide a switching signal which controls the operational state of the buffer 12a. The buffers 12b and 13b are connected to the controller 76 via the control line 15b so as to provide a switching signal which selectively sets one of the buffers 12b and 13b to the activated state. The buffers 12c and 13c are connected to the controller 76 via the control line 15c so as to provide a switching signal which selectively sets one of the buffers 12c and 13c to the activated state. The switch 14 is connected to the controller 76 via a control line 15d so as to provide a switching signal which controls the operational state of switch 14. Additionally, inverters 16b and 16c are provided to the control lines 15b and 15c connected to the buffers 13b and 13c, respectively, so as to invert the switching signals on the control lines 15b and 15c.

A power source 17 is provided to operate the switching unit 11. Power is provided to the power source 17 from the controller 76 via a power source line 18, and also provided from the second printer 2 via a peripheral logic high (P.L.H.) line 19 of the second connector interface 75. The P.L.H. line 19 is provided for checking whether power of the second printer 2 is turned on. Specifically, the centronics interface is provided with a small current from the second printer 2. Since diodes 20 and 21 are provided on the power source line 18 and the P.L.H. line 19, respectively, the two lines 18 and 19 are connected in a logic summing manner.

When the MFP device 51 is turned on, the switching signals provided to the control lines 15a, 15b and 15c are initially set to a high level, and the switching signal provided to the control line 15d is initially set to a low level. In this state, since the buffers 12a to 12c are in the active state, the switch 14 is turned off and the buffers 13b and 13c are in the inactive state, the first printer signal transmission path 9 is set to be effective.

Additionally, the personal computer 71 has a function for selectively designating one of the MFP device 51 and the second printer 72. The personal computer 71 also has a switching command sending function for selecting a printer driver based on the selective designation. Specifically, for example, when a printing operation for an application of a word processor is performed, the MFP device 51 can be automatically designated by selecting the printer driver for the MFP device 51. Alternatively, when a printing operation for an application of a word processor is performed, the second printer 72 can be automatically designated by selecting the printer driver for the second printer 72. This function is performed by a CPU (not shown in the figure) of the personal computer 71.

In the MFP device 51, the CPU 58 performs various processes and controls in accordance with the program data stored in the ROM of the memory 59. In the present embodiment, a determining function, a path state switching function and a concurrent printing function are provided. The determining function determines, whether the switching command designates the MFP device 51 or the second printer 72, when the switching command is sent by the switching command sending function so as to select the printer driver in accordance with the operation for designating the printer by the personal computer 71. Additionally, the path state switching function switches the state of paths by operating the switching unit 11 so as to effect one of the first printer signal reception path 9 and the second printer signal reception path 10 in accordance with the determination result of the determining function. Further, the concurrent printing function functions to provide image data generated by the scanner unit 52 of the MFP device 51 to both the printer unit 53 and the second printer 72 so as to concurrently print the image data by both the MFP device 51 and the second printer 72.

In the above-mentioned structure in which the MFP device 51 and the second printer 72 are connected to the personal computer 71, when all power is turned on, the controller 76 changes the switching signals on the control lines 15a, 15b and 15c to the high level. The switching signal on the control line 15d is at the low level. Accordingly, the first printer signal transmission path 9 becomes effective, resulting in a state where only the MFP device 51 is connected to the personal computer 71. Thus, a printing operation can be performed by the MFP device 51 by sending character print data, other data or signals. In this case, monochrome printing can be provided with a high quality image at a high-speed. Additionally, the image data generated by the scanner unit 52 of the MFP device 51 can be sent to the personal computer 71 so as to store the image data in the personal computer 71.

Figure 14:
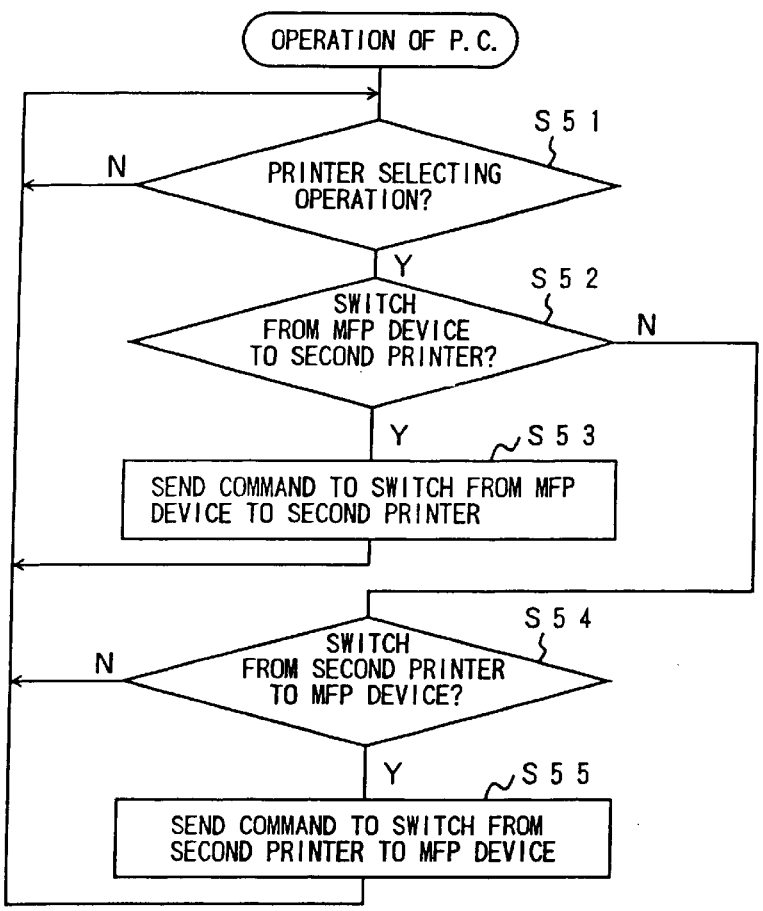
FIG. 14 is a flowchart of an operation of a personal computer shown in FIG. 11.
Figure 15:
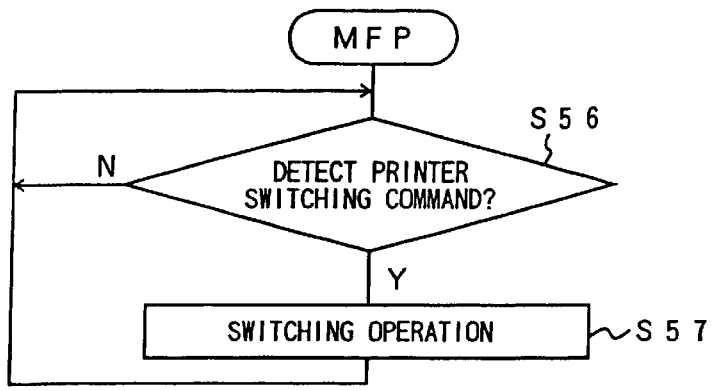
FIG. 15 is a flowchart of an operation of an MFP device shown in FIG. 11.

A description will now be given, with reference to flowcharts shown in FIGS. 14 and 15, of a switching operation from the MFP device 51 to the second printer 2 and switching from the second printer 72 to the MFP device 51. In order to switch to a printer for a printing operation, the printer driver corresponding to the printer to be used is selected by the personal computer 71 when a printing operation is performed in the word processor application. Accordingly, it is determined first, in step S51, whether or not an operation for selecting the printer is performed. If it is determined that the operation for selecting is performed, it is then determined, in step S52, whether or not the switching is from the MFP device 51 to the second printer 72. If the determination of step S52 is negative, it is determined, in step S54, whether or not the switching is from the second printer 72 to the MFP device 51. On the other hand, if the determination of step S52 is affirmative, the routine proceeds to step S53 where the personal computer 71 sends to the MFP device 51 a switching command for switching from the MFP device 51 to the second printer 72.

If it is determined, in step S54, that the switching is from the second printer 72 to the MFP device 51, the routine proceeds to step S55. In step S55, the personal computer 71 sends to the MFP device 51 a switching command for switching from the second printer 72 to the MFP device 51. The process of steps S53 to S55 is performed as a function of the switching command sending function in the personal computer 71.

When a command is sent from the personal computer 71 to the MFP device 51 via the connector interface 74, the command is received in the CPU 58 of the controller 76. It is then determined, in step S56 of FIG. 15, whether or not the command is the switching command for the printer. If it is determined that the command is the switching command, the switching unit 11 is operated, in step S57, so as to switch from the MFP device 51 to the second printer 72. That is, when the switching command is input and if the command represents the switching from the MFP device 51 to the second printer 72, the switching signal provided to the switching unit 11 is changed from the high level to the low level. Thereby, the second printer signal transmission path 10 is effected. This state is equivalent to the state where only the second printer 2 is connected to the personal computer 71. Thus, a printing operation is performed by the second printer by sending character image data or other necessary data to the second printer 72 via the second printer signal transmission path 10. In this case, a multi-color printing can be provided. When viewing from the MFP device 51, the character image data goes through to the second printer 72.

On the other hand, when the switching command is input and if the command represents the switching from the second printer 72 to the MFP device 51, the switching signal provided to the switching unit 11 is changed from the low level to the high level. Thereby, the first printer signal transmission path 9 is effected. This state is equivalent to the state where only the MFP device 51 is connected to the personal computer 71. Thus, a printing operation is performed by the MFP device 51 by sending character image data or other necessary data to the MFP device 51 via the first printer signal transmission path 9. Accordingly, the process of step S56 is performed as the function of the determining function, and the process of step S57 is performed as a function of the path state switching function.

As mentioned above, according to the present embodiment, the MFP device 51 itself has the connector function and the switching function so that the MFP device 51 and the second printer 72 are connected to a single centronics interface line extending from the personal computer 71. That is, a system can be provided in which a remote switching control is performed by the personal computer 71. Especially, according to the present embodiment, since the system is constructed so that the MFP device 51 is the center of the system by providing the switching function to the interface unit of the MFP device 51 which is one of objects to be switched, at least all of the command system of the MFP device 51 is known. Thus, even if the command system of the second printer 72 is unknown, switching between the MFP device 51 and the second printer 72 can be reliably performed. Additionally, as the MFP device 51 itself has the switching function in the interface unit, the connection of the MFP device 51 can be achieved by internal wiring without a connector. Thus, a length of wire or cable can be shorter than that of a case in which a separate switching device is used. This improves antinoise characteristics. Further, since the MFP device 51 has the switching device therein, a power source for the switching device can be the power source for the MFP device 51. That is, a separate power source is not needed as in the case of the separate switching device.

A description will now be given of an operation for printing the image data generated by the scanner unit 52 of the MFP device 51. Since the MFP device 51 has the scanner unit 52 and the printer unit 53, the image data generated by scanning an original document by the scanner unit 52 can be printed by the printer unit 53. This means that the MFP device 51 includes a copying function. The MFP device according to the present embodiment has an ability to print the image data generated by the scanner unit 52 by both the printer unit 53 of the MFP device 51 and the second printer 72 at the same time. This function is performed by the concurrent printing function under the control of the CPU 58. When a copy mode is designated by the operational unit 60 in a printing mode where a plurality of copies are printed, concurrent printing is performed. That is, the controller 76 changes the switching signals on the control lines 15*a* and 15*d* to the high level so that the data buses 9*a* and 10*a* are effective to connect the controller 76 to the second connector interface 75. Thus, the MFP device 51 is connected to the second printer 72. In this state, when the scanner unit 52 scans an original image and generates image data, the image data is sent to the printer unit within the MFP device 51, and is simultaneously sent to the second printer 72 via the data busses 9*a* and 10*a* and the second connector interface 75. Accordingly, both the printer unit 53 and the second printer 72 print the image data at the same time. This achieves a circumstances in which the personal computer 71 is connected to two printers in parallel. Thus, since the printing operation of a plurality of copies can be distributed to the two printers, that is, the printer unit 53 and the second printer 72, the printing operation for a plurality of copies can be performed at a high speed. The present embodiment takes advantage of the fact that the personal computer 71 is substantially connected to the two printers.

It should be noted that, as for the determining function and the path state switching function, the present invention is not limited to that specifically disclosed, and other appropriate determining and path state switching functions or units may be used.

A description will now be given of a seventh embodiment of the present invention. The structure of the seventh embodiment is basically the same with that of the sixth embodiment, and a description will be given with reference to FIG. 13. In the present embodiment, the CPU 58 of the MFP device 51 performs a memory control function in addition to the determining function and the path state switching function. When the image data sent from the personal computer 71 is printed by the second printer 72, the memory control function operates the image memory 57 as a printer buffer by connecting between the connector interface 74 and the MFP device 51.

In the present embodiment, when a print mode is designated in which the second printer 72 is used to print image data generated by the personal computer 71, the second printer signal transmission path 10 is not effective but the first printer signal transmission path 9 is turned on so as to be effective and provide the image data from the personal computer 71 to the image memory 57 of the MFP device 51 via the connector interface 74 and the bidirectional buffer 12*a*. The image data is then temporarily stored in the image buffer 57. The image data is then sent to the second printer 72 via the data buses 9*a*, and 10*a* by effecting the data buses 9*a* and 10*a* between the controller 76 and the connector interface 75. The data busses 9*a* and 10*a* are effected by changing the switching signals on the control lines 15*a* and 15*d* to the high level. Accordingly, the image memory 57, which is originally provided for facsimile transmission, can be used as a buffer for printing operation. This eliminates the need for using a buffer for printing operations in the personal computer 71. Thus, there is no time loss caused by the buffer in the personal computer 71. That is, this takes advantage of the fact that the personal computer 71 is connected to the MFP device 51 which has the image memory therein.

A description will now be given of an eighth embodiment of the present invention. A structure of the present embodiment is basically the same as that of the seventh embodiment, and a description will be given with reference to FIG. 13.

In this embodiment, a scanner is used as the second peripheral device. That is, the scanner is used instead of the second printer 72. Hereinafter, the scanner is referred to as a second scanner 72. As for the second scanner 72, for example, a color scanner or a high-resolution scanner may be used. In the present embodiment, the CPU 58 of the MFP device 51 performs functions as an operation control function in addition to the determining function and the path state switching function. The operation control function is performed when the image data generated by the second scanner 72 is sent to the personal computer 71. Specifically, the second connector interface 75 and MFP device 51 are connected, and the image memory 57 is used as a data buffer so that the image data generated by the second scanner 72 is temporarily stored in the image memory 57.

In the present embodiment, when a print mode is designated in which image data generated by the second scanner 72 is sent to the personal computer 71, the data buses 10*a* and 9*a* are turned on so as to be effective and the second scanner 72 is operatively connected to the MFP device 51 by changing the switching signals on the control lines 15*a* and 15*d* to the high level. Thus, the image data generated by the second scanner can be temporarily stored in the image memory 57 in the MFP device 51 as a data buffer. That is, the image memory 57 serves as a data buffer similar to the manner when image data received by the NCU 55 for facsimile communication is stored or image data generated by the scanner unit 52 is stored. Thereafter, the first print signal transmission path 9 is turned on so as to be effective and to operatively connect the MFP device 51 to the personal computer 71. Thus, the image data in the image memory 57 can be sent to the personal computer 71 via the data bus 9*a*. Thereby, the image data generated by the second scanner 72 can be sent to the personal computer 71 via the image memory 57.

Accordingly, in the present embodiment, a high-speed reading operation can be performed by the second scanner 72 since a delay in the operation speed of the application can be eliminated as compared to a case in which the second scanner is directly connected to the personal computer 71. Additionally, when the second scanner 72 is directly connected to the personal computer 71, image data generated by the second scanner 72 may be reduced so as to avoid a lack of capacity of a memory provided in the personal computer 71. The reduction of image data is generally performed, for example, by intermittently eliminating image data generated by the scanner. Thus, in such a case, the image quality is deteriorated even when a high-resolution scanner is used as the second scanner 72. In this respect, according to the present invention, since the image memory 57 is used as a data buffer which is originally for facsimile communication and has inherently a large capacity, there is no need to reduce the amount of image data. Thus, the image quality can be improved as compared to the case where the scanner is directly connected to the personal computer 71. That is, the image reading capability of the scanner 72 is not deteriorated due to lack of memory capacity. This embodiment takes advantage of the fact that the second scanner 72 is connected to the personal computer 71 via the MFP device 51 having the image memory 57 therein.

A description will now be given of a ninth embodiment of the present invention. The basic structure and operation of the ninth embodiment is the same as that of the first embodiment, and a description will be given, with reference to FIG. 2, of structures and operations different from that of the first embodiment.

In this embodiment, when the second printer is used, an ESC command is sent by the personal computer 3. The ESC command comprises a printer selection code in accordance with an escape sequence. The controller 8 receives the ESC command via the first printer signal transmission path, and the CPU 7 recognizes the reception of the command. Thus, the CPU 7 changes the switching signals on the control lines 15a to 15c to the low level, and changes the switching command on the control line 15d to the high level. Thereby, the buffers 13b and 13c are set to the active state, and the switch 14 is closed so as to be turned on, resulting in the second printer signal transmission path being effective. Accordingly, the system is set in a state equivalent to a state where only the second printer 2 is connected to the personal computer 3 via the connectors 5 and 6. Thus, a printing operation can be performed by the second printer 2 by sending from the personal computer 3 image data, character data or other data and signals. In this embodiment, multicolor printing can be performed.

On the other hand, in order to return the system to the state where the first printer 1 is usable, the personal computer 3 sends a printer initialization signal (/INIT) to the printer interface switching device 4 via the first connector 5. The printer initialization signal (/INIT) is a signal conforming to the centronics standard, and thus this signal is readable by the CPU 7. When the printer initialization signal (/INIT) is received, the CPU 7 operates the switching unit 11 to be returned to the initial state after the power is turned on. Thus, the first printer signal transmission path 9 is turned on so as to be effective instead of the second printer signal transmission path 10. In such a switching operation, it is better to use a command readable by the second printer 2. However, the command system of the second printer is unknown as far as the first printer 1 is concerned. Thus, the command system of the second printer 2 does not always conform to the command system of the first printer 1. Rather, in many cases, the command systems of the first and second printers are different from each other. In such a case, if a command conforming to the command system of the second printer is sent to the first printer 1, the command cannot be read by the CPU 7 of the first printer 1, and thus the switching operation from the second printer 2 to the first printer 1 cannot be performed. Accordingly, in the present embodiment, the switching operation is performed by using a command which is positively readable by the CPU 7 of the first printer 1. Therefore, control of the first printer 1 and the second printer 2 can be arbitrarily performed by the personal computer 3.

It is possible that a situation could occur in which the first printer 1 is turned off and the second printer and the personal computer 3 are turned on. Even in such a situation, it is desirable that the second printer 2 can be usable by the personal computer 3. Since the printer interface switching device 4 is incorporated into the first printer 1 and the power of the first printer is turned off, the switching unit 11 cannot be operated to switch the connection to the second printer 2 when the power is provided to the switching unit 11 only from the first printer 1. However, in the present embodiment, the power is provided to the switching unit 11 from the second printer via the connector 6 and the switching unit 11 can be operated when the second printer 2 is turned on. Additionally, in this embodiment, the second printer signal transmission path 10 is effective even when the controller 8 of the first printer 1 does not operate due to the first printer 1 being turned off since the low level of the switching signal provided to the switching unit 11 is set to a ground level which is provided when the first printer 1 is turned off. Accordingly, the second printer 2 can be operatively connected to the personal computer even when the power of the first printer 1 is turned off.

Figure 16:
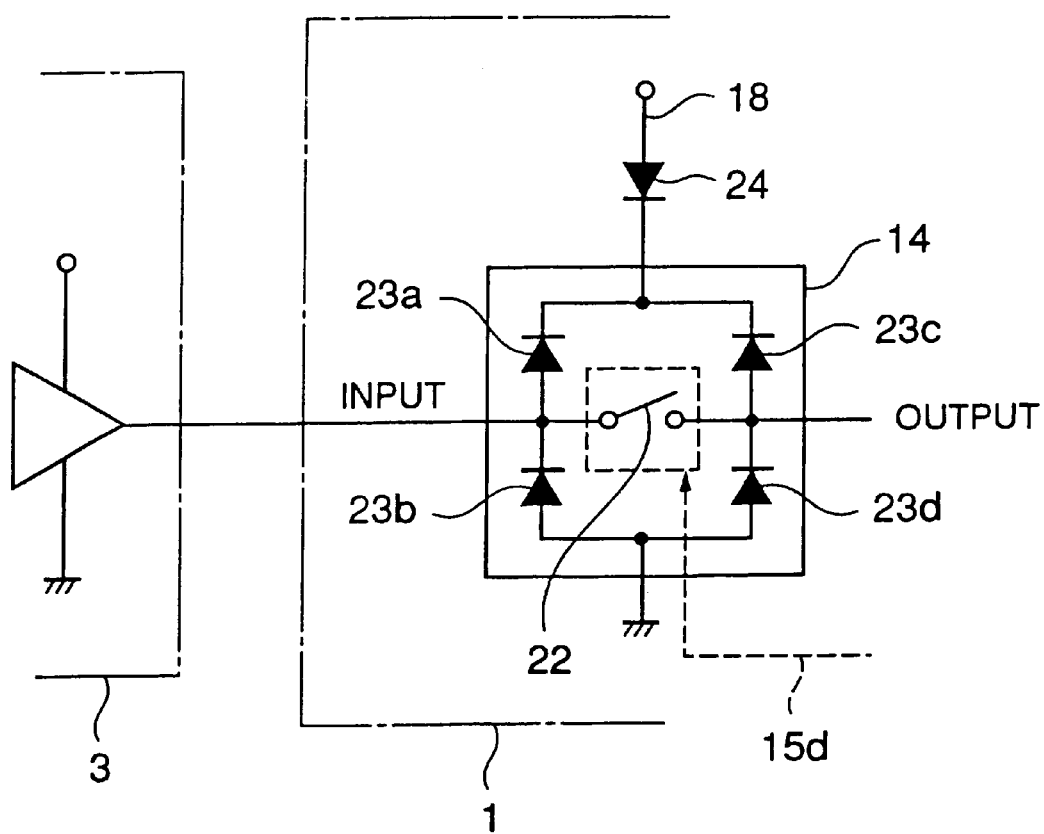
FIG. 16 is a circuit diagram of a switch shown in FIG. 13.

A description will now be given, with reference to FIG. 16, of a structure and an operation of the switch 14 of FIG. 2. The switch 14 may be a mechanical switch. However, it is preferable that the switch 14 is an analog IC switch 22 constructed by an integrated circuit. In this case, in order to protect the analog switch 22 from an external noise, protective diodes 23a to 23d are interposed between the input and output signal terminals and the power source as shown in FIG. 16. However, if only the protective diodes 23a to 23d are provided, a state of the power source of the switch 14 is equivalent to a state where the power source is grounded. Thus, it is possible that a reverse current could flow into the analog IC switch 22 via the signal line. This is not preferable since the reverse current may destroy the analog IC switch 22 which comprises an integrated circuit. Accordingly, in the present embodiment, in order to prevent the reverse current from flowing into the analog IC switch 22, a diode 24 (correspond to the diode 20 in FIG. 2) is provided on the power source line 18 in a direction opposite to the direction of the diodes 23a to 23d. Thus, even if the first printer 1 is turned off and the personal computer 3 is turned on, the reverse current does not flow into the analog IC switch 22 from the signal line. Thus, the analog IC switch 22 is positively protected.

The present invention is not limited to the specifically disclosed embodiments, and variations and modifications may be made without departing from the scope of the present invention. For example, although the above-described embodiments refer to a host computer as providing the data, any other type of user device as a network, for example, can provide the data. In addition, although the embodiments refer to the use of printers or multi-functional peripherals, other types of peripheral devices such as facsimile and scanner type device may be used.

What is claimed is:

1. A peripheral interface switch provided in a first peripheral device for connection to at least one user device providing image data, a second peripheral device capable of being connected to said first peripheral device via said peripheral interface switch, said printer interface switch comprising:

a first connector for connection to said at least one user device;

a second connector for connection to said second peripheral device;

a first signal transmission path connecting said first connector and said first peripheral device;

a second signal transmission path connecting said first connector and said second connector;

a path state switch for selectively switching a state of said first and second signal transmission paths so that said first signal transmission path is selected when power to said first peripheral device is activated, said second signal transmission path being selected when a peripheral selection code is provided from said at least one user device, said first signal transmission path also being selected when a signal capable of being read by said first peripheral device is provided from said user device.

2. The printer interface switch as claimed in claim 1, wherein said first and second signal transmission paths include a data bus for transmitting data from said user device, and said path state switch includes an analog switch having an input terminal and an output terminal, a protective diode being provided between a power source and each of said input and output terminals, a reverse current preventing element being provided between said analog switch and said power source.

3. The printer interface switch as claimed in claim 1, wherein power is provided from both said first peripheral device and said second peripheral device via said second connector in a logic summing mode, a switching signal being provided to said path state switch so as to switch a state of said first and second signal transmission paths, a state of the switching signal provided to change said second signal transmission path to be effective being identical to a state of the switching signal provided to said path state switch when said first peripheral device is turned off.

4. A peripheral device for connecting to a user device providing image data, said peripheral device for connection to a second peripheral device via a peripheral interface switch provided in the peripheral device, said peripheral interface switch comprising:

a first connector for connection to said at least one user device;

a second connector for connection to said second peripheral device;

a first signal transmission path connecting between said first connector and said peripheral device;

a second signal transmission path connecting between said first connector and said second connector;

a path state switch for selectively switching a state of said first and second signal transmission paths so that said first signal transmission path is selected when power to said peripheral device is activated, said second signal transmission path being selected when a selection code is provided from said at least one user device, said first signal transmission path also being selected when a signal capable of being read by said peripheral device is provided from said at least one user device.

5. A peripheral interface switch controlled by a first peripheral device and connected to a data bus providing image data from at least one user device, a second peripheral device being connected to said first peripheral device via said peripheral interface switch, said peripheral interface switch comprising:

a first connector for connection to said data bus;

a second connector for connection to said second peripheral device;

a first signal transmission path connecting said first connector and first peripheral device;

a second signal transmission path connecting said first connector and said second connector;

a path state switch for selectively switching a state of said first and second signal transmission paths; and a controller for monitoring the data bus and for controlling said path state switch accordingly, said controller controlling said path state switch so that said first signal transmission path is selected when power to said first peripheral device is activated, and said second signal transmission path is selected when data not capable of being read by said first peripheral device is provided from said at least one user device via said data bus, said first signal transmission path being again selected when a signal capable of being read by said first peripheral device is provided from said user device via said data bus.

6. A peripheral device for connecting via a data bus to a user device providing image data, said peripheral device connecting to a second peripheral device via a peripheral interface switch provided in the first peripheral device, said peripheral interface switch comprising:

a first connector for connection to said data bus;

a second connector for connection to said second peripheral device;

a first signal transmission path connecting said first connector and said first peripheral device;

a second signal transmission path connecting said first connector and said second connector;

a path state switch for selectively switching a state of said first and second signal transmission paths; and a controller for monitoring the data bus and for controlling said path state switch accordingly, said controller controlling said path state switch so that said first signal transmission path is selected when power to said first peripheral device is activated, and said second signal transmission path is selected when data not capable of being read by said first peripheral device is provided from said at least one user device via said data bus, said first signal transmission path being again selected when a signal capable of being read by said first peripheral device is provided from said user device via said data bus.

7. An image forming system for selectively providing image data from at least one user device to one of a first printer and a second printer via a data bus, the first printer comprising:

a first connector for connection to the data bus for receiving data from the at least one user device;

a second connector for connecting to the second printer;

a bidirectional buffer connected with the data bus via said first connector for controlling a direction of flow of data;

a switching unit connected with the data bus via said first connector for selectively connecting the data bus with the second connector; and a controller for monitoring the data transmitted via the data bus from the at least one user device, the controller generating control signals for controlling the bidirectional buffer and said switching unit in response to the data, wherein when the data being monitored on the data bus by the controller cannot be read by said controller, said switching unit is controlled so that the data on the data bus is directed toward the second printer via the second connector for printing and when the data being monitored on the data bus by the controller-can be-read by said controller, said bidirectional buffer is controlled so that the data on the data bus is read by the controller for printing by the first printer.

8. A peripheral interface provided in a first peripheral device for receiving image data from at least one user device via a data bus and for selectively providing the data from the data bus to the first peripheral device or a second peripheral device for processing said peripheral interface comprising:
  a first connector for connection to the data bus for receiving data from the at least one user device;
  a second connector for connecting to the second peripheral device;
  a bidirectional buffer connected with the data bus via said first connector for controlling a direction of flow of data;
  a switching unit connected with the data bus via said first connector for selectively connecting the data bus with the second connector; and
  a controller for monitoring, the data transmitted via the data bus from the at least one user device, the controller generating control signals for controlling the bidirectional buffer and said switching unit in response to the data,
  wherein when the data being monitored on the data bus by the controller cannot be read by said controller, said switching unit is controlled so that the data on the data bus is directed toward the second peripheral device via the second connector for printing and when the data being monitored on the data bus by the controller can be read by said controller, said bidirectional buffer is controlled so that the data on the data bus is read by the controller for printing by the peripheral device.

9. A peripheral device for receiving image data from at least one user device via a data bus for selectively providing the data from the data bus to the first peripheral device or a second peripheral device for processing, said peripheral device comprising:
  a first connector for connection to the data bus for receiving data from the at least one user device;
  a second connector for connecting to the second peripheral device;
  a bidirectional buffer connected with the data bus via said first connector for controlling a direction of flow of data;
  a switching unit connected with the data bus via said first connector for selectively connecting the data bus with the second connector;
  a controller for monitoring the data transmitted via the data bus from the at least one user device, the controller generating control signals for controlling the bidirectional buffer and said switching unit in response to the data; and
  a processor for processing received image data in response to a signal from said controller, said processor printing the received image data on a printing medium,
  wherein when the data being monitored on the data bus by the controller cannot be read by said controller, said switching unit is controlled so that the data on the data bus is directed toward the second peripheral device via the second connector and when the data being monitored on the data bus by the controller can be read by said controller, said bidirectional buffer is controlled so that the data on the data bus is read by the first peripheral device.

10. A method of controlling a peripheral interface switch provided in a first peripheral device connected to a data bus providing image data, a second peripheral device being connected to the first peripheral device via the peripheral interface switch, the peripheral interface switch being connected to the data bus, the peripheral interface switch being connected to the second peripheral device, said method comprising the steps of:
  providing via the data bus data to be processed by one of the first peripheral device and the second peripheral device; and
  selectively controlling via the first peripheral device the peripheral interface switch so that the image data on the data bus is directed to the first peripheral device for processing when power to the first peripheral device is activated, and so that the image data is directed to the second peripheral device for processing when image data not capable of being read by the first peripheral device is on the data bus.

11. A method of controlling a first peripheral device for connecting to a data bus, said first peripheral device connecting to a second peripheral device via a peripheral interface switch provided in the first peripheral device, said method comprising the steps of:
  providing via the data bus data to be processed by one of the first peripheral device and the second peripheral device; and
  selectively controlling the peripheral interface switch via the first peripheral device so that the image data on the data bus is directed to the second peripheral device for processing when a selection code is provided on the data bus and the image data is directed to the first peripheral device for processing when a signal capable of being read by the first peripheral device is provided on the data bus.

* * * * *